United States Patent [19]
Keville et al.

[11] Patent Number: 5,730,417
[45] Date of Patent: Mar. 24, 1998

[54] MINIATURE PIEZO ELECTRIC VACUUM INLET VALVE

[75] Inventors: Robert F. Keville, Valley Springs; Daniel D. Dietrich, Livermore, both of Calif.

[73] Assignee: Regents of the University of California, Oakland, Calif.

[21] Appl. No.: 650,751

[22] Filed: May 20, 1996

[51] Int. Cl.⁶ .................................................. F16K 31/02
[52] U.S. Cl. .......................... 251/129.06; 251/367
[58] Field of Search ............... 251/129.06, 129.01, 251/367

[56] References Cited

U.S. PATENT DOCUMENTS

| | | | |
|---|---|---|---|
| 3,055,631 | 9/1962 | Kippenhan | 251/129.06 |
| 4,695,034 | 9/1987 | Shimizu et al. | 251/129.06 |
| 4,907,748 | 3/1990 | Gardner et al. | 251/129.06 X |
| 5,031,841 | 7/1991 | Schäfer | 251/129.06 X |

FOREIGN PATENT DOCUMENTS

| | | | |
|---|---|---|---|
| 113975 | 5/1987 | Japan | 251/129.06 |
| 288782 | 12/1987 | Japan | 251/129.06 |

*Primary Examiner*—Kevin Lee
*Attorney, Agent, or Firm*—L. E. Carnahan; Henry P. Sartorio

[57] ABSTRACT

A miniature piezo electric vacuum inlet valve having a fast pulse rate and is battery operated with variable flow capability. The low power (<1.6 watts), high pulse rate (<2 milliseconds), variable flow inlet valve is utilized for mass spectroscopic applications or other applications where pulsed or continuous flow conditions are needed. The inlet valve also has a very minimal dead volume of less than 0.01 std/cc. The valve can utilize, for example, a 12 Vdc input/ 750 Vdc, 3 mA output power supply compared to conventional piezo electric valves which require preloading of the crystal drive mechanism and 120 Vac, thus the valve of the present invention is smaller by a factor of three.

19 Claims, 2 Drawing Sheets

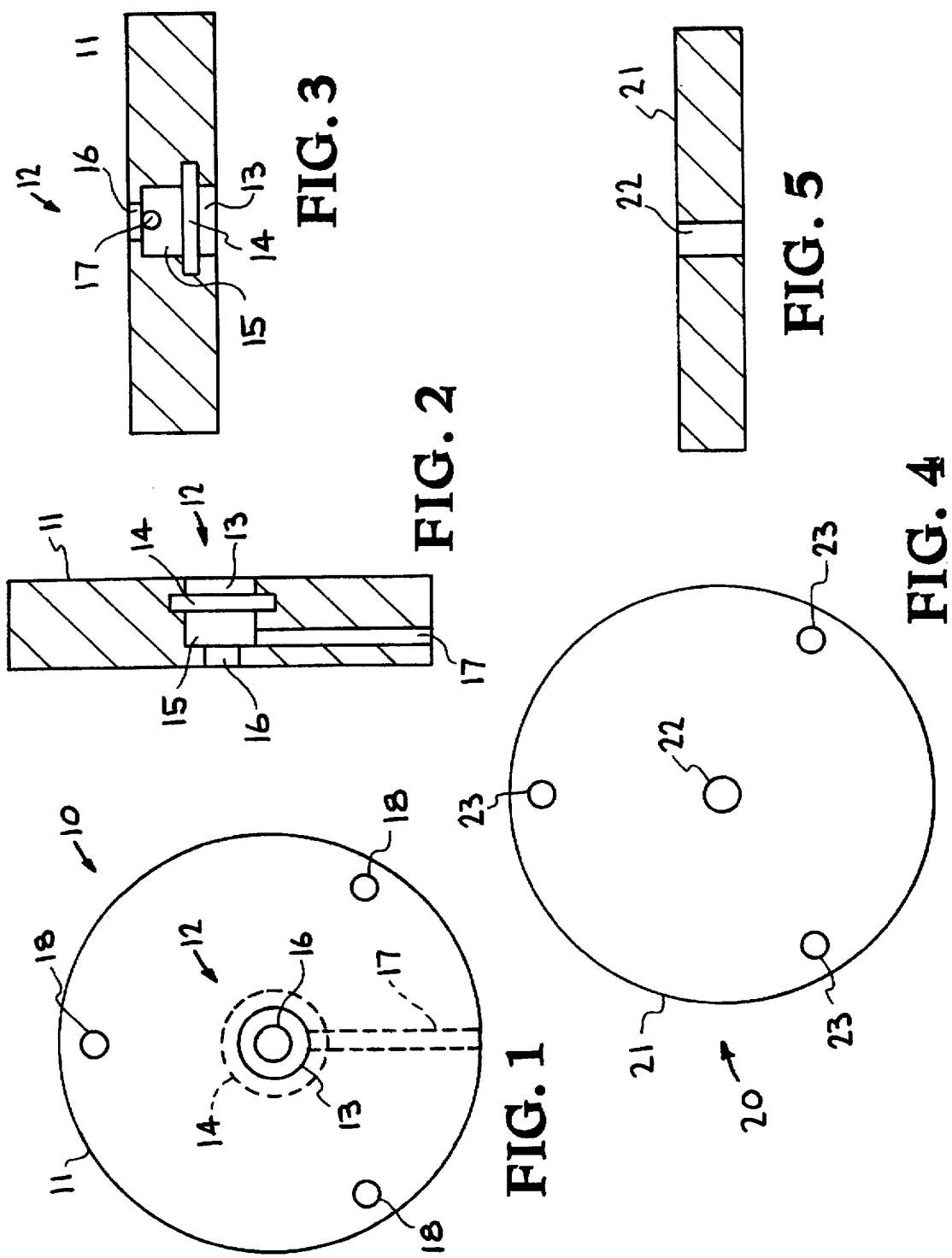

MINIATURE PIEZO ELECTRIC VACUUM INLET VALVE

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

The present invention relates to vacuum inlet valves, particularly to piezo electric valves, and more particularly to a miniature, battery operated, low power, high pulse rate, variable flow valve.

Vacuum valves have been utilized in various applications, and piezo electric valves have been developed for lower power applications. Such valves are utilized, for example, in mass spectroscopic applications or other applications where pulsed or continuous flow conditions are needed. Current efforts are being directed to the development of portable, low power mass spectrometers for the detection of environmental pollutants or illicit substances, and to use such in conjunction with other techniques such as gas chromatography or fluorescent analysis, for example. Such a mass spectrometer is disclosed in U.S. Pat. No. 5,451,781, issued Sep. 19, 1995 to D. D. Dietrich et al., and assigned to the assignee of the instant application. Prior vacuum valves are typically of pulsed solenoid design with high power requirements and nonadjustable flow conditions with dead volumes on the order of 0.2–0.4 std/cc.

During the development of the miniature mass spectrometer of the above-referenced patent, it became apparent that an inlet valve was needed which would have a fast pulse rate and be battery operated with variable flow capability. The current state of the art piezo electric valves require a 120 volt ac power source and are a factor of three larger than could be used. The present invention allows these conditions and provides a valve that can operate on a 12 Vdc input, 750 Vdc output power supply. Other piezo electric valves which are currently available are larger by a factor of three and require preloading of the crystal drive mechanism and 120 Vac.

SUMMARY OF THE INVENTION

It is an object of the present invention to provide a piezo electric valve.

A further object of the invention is to provide a battery operated piezo electric valve.

Another object of the invention is to provide a low power, high pulse rate, variable low valve.

Another object of the invention is to provide a battery operated, low power, high pulse rate, variable flow, miniature piezo electric vacuum inlet valve, particularly for mass spectroscopic applications, for example.

Another object of the invention is to provide a miniature vacuum inlet valve utilizing a 12 volt dc input, -750 volt dc, 3 mA output power supply, and smaller by a factor of three than the current piezo electrical valves.

Other objects and advantages of the present invention will become apparent to those skilled in the art from the following description and accompanying drawings. The invention provides a battery operated, low power (<1.6 watts), high pulse rate (<2 milliseconds), and variable flow valve utilized for mass spectroscopic applications or other applications where pulsed or continuous flow conditions are needed. The valve of this invention also has a very minimal dead volume of less than 0.01 std/cc, compared to 0.2–0.4 std/cc dead volumes of the currently known valves. Basically, the miniature piezo electric vacuum inlet valve of the present invention comprises two disks interconnected by three stand-off rods or spacers and between which is located a mini disk translator. The valve is powered by a 12 volt battery which can be stepped up to an adjustable maximum of 750 volts dc.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1 is a side view, with sections shown in phantom, of the inlet disk of the piezo electric inlet valve.

FIG. 2 is a cross-sectional view of the FIG. 1 disk.

FIG. 3 is a cross-sectional view of the FIG. 1 disk rotated 90° with respect to FIG. 2.

FIG. 4 is a side view of the adjustable back disk of the piezo electric inlet valve.

FIG. 5 is a cross-sectional view of the FIG. 4 back disk.

DETAILED DESCRIPTION OF THE INVENTION

Figure 6:
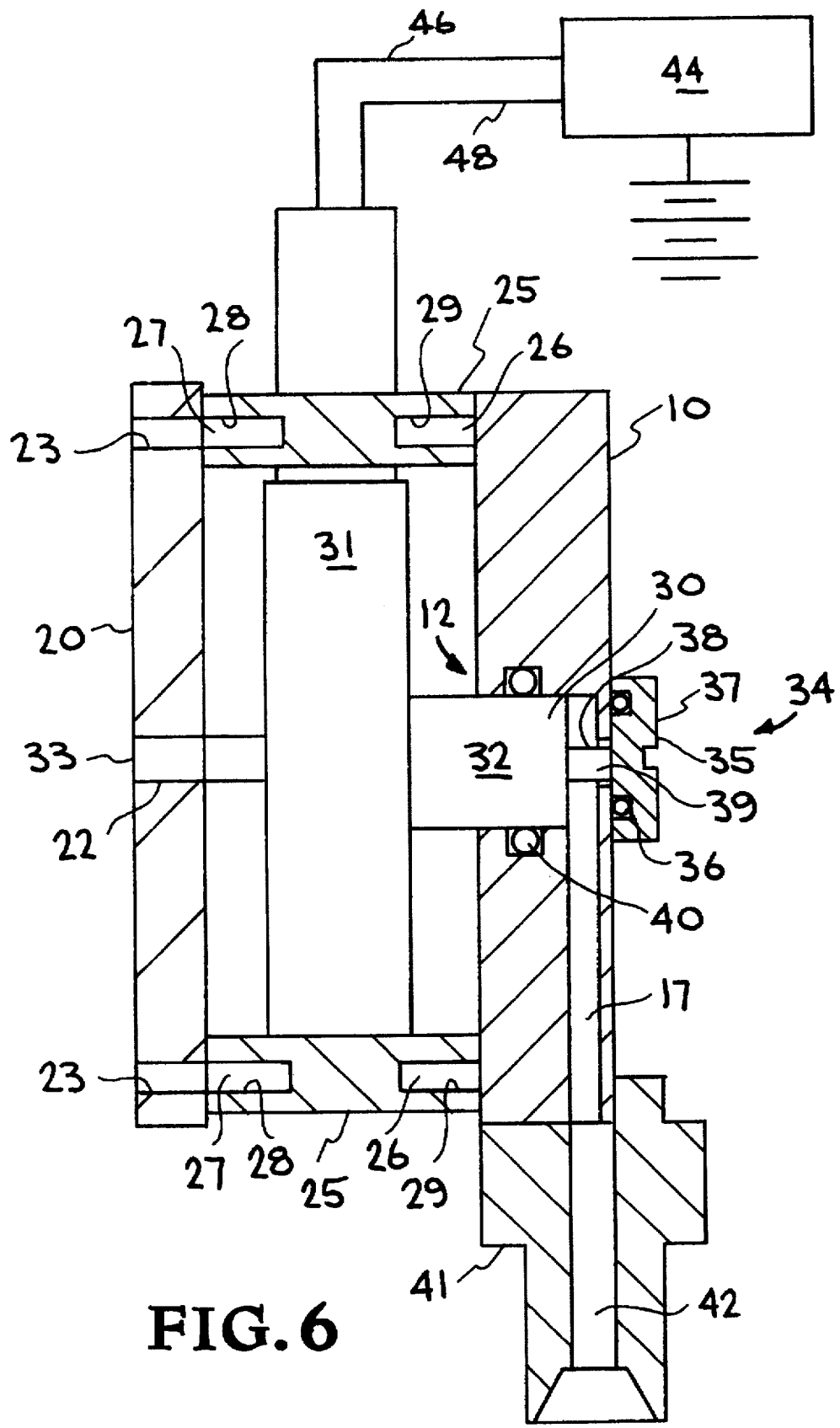
FIG. 6 is a partial cross-sectional view of a piezo electric inlet valve utilizing the disks of FIGS. 1 and 4.

The invention involves a miniature piezo electric vacuum inlet valve, particularly adapted for use in mass spectroscopic applications or other applications where pulsed or continuous flow conditions are needed. The valve is of a variable flow type, battery operated (12 volt dc input, -750 volt dc, 3 mA output), low power (<1.6 watts), and high pulse rate (2 milliseconds), which has a very minimal dead volume of less than 0.01 std/cc. Also, the valve of this invention is smaller by a factor of three compared to other piezo electric valves which typically operate on 120 volt ac, require preloading of the crystal drive mechanism, and have dead volumes on the order of 0.2–0.4 std/cc.

The piezo electric valve of this invention utilizes two disks, which for example can be constructed of Inconel metal. These two disks comprise an inlet disk (see FIGS. 1–3) and an adjustable back disk (see FIGS. 4 and 5). The two disks are separated by a plurality of spacers or stand-off rods, which may be constructed of ceramic material, such as lead titanium actinate (see FIG. 6). Captured between the two disks is a mini disk translator or crystal drive mechanism, as seen in FIG. 6. Attached to the vacuum end of the translator is a seal assembly which includes a poppet and poppet stem sealed from atmosphere by an O-ring of viton material. A gas inlet is drilled at 90° to the axis of motion and radially placed. The valve is powered by a 12 volt battery which is stepped up to an adjustable maximum of 750 volts dc. By adjusting the output voltage or pulse width, the poppet opening can be gauged to a maximum of 0.002 inch with a maximum ramp time of less than 3 millisecond. A typical scenario, assuming a vacuum pressure of $3 \times 10^{-9}$ millibar, will allow for a pressure rise to $3.7 \times 10^{-9}$ millibar if the valve is pulsed for 3.5 milliseconds at 750 volts dc, 3 mA output voltage.

Referring now to the drawings, FIGS. 1–3 illustrate an embodiment of an inlet disk generally indicated at 10 and composed of a body 11 having a centrally located aperture or opening 12 extending therethrough. Opening 12 is composed of four (4) interconnected sections indicated at 13, 14, 15, and 16, with sections 13 and 15 being of the same diameter, section 14 being of a larger diameter and section 16 being of a smaller diameter. Body 11 of disk 10 also includes a passageway 17 extending radially from section 15 of opening 12, which functions as a gas inlet. Body 11 also includes in this embodiment three equally spaced apertures 18 which extend therethrough.

By way of example, the disk 10 may be constructed of Incoriel metal, Everdur or Hastalloy with a diameter of 1.023 inch to 1.025 inch and thickness of 0.186 inch to 0.187 inch, in this embodiment the diameter is 1.023 inch and thickness is 0.186 inch. The opening sections 13–16 may vary depending on the disk translate support shaft size (described thereinafter with respect to FIG. 6), but in this embodiment the diameter of sections 13 and 15 is 0.1945 inch, the diameter of section 14 is 0.260 inch, the diameter of section 16 is 0.080 inch, and the diameter of radial passageway 17 is 0.039 inch drilled at 90° to the axis of motion. The apertures 18 in this embodiment have a diameter of 0.06125.

As shown in FIGS. 4 and 5, the illustrated embodiment of the adjustable back disk, generally indicated 20, is composed of a body 21 having a centrally located aperture or opening 22 extending therethrough and three apertures or openings 23.

By way of example, the body 21 of back disk 20 may be constructed of Inconel metal, Everdur or Hastalloy, with a diameter of 1.023 inch to 1.025 inch and thickness of 0.100 inch to 0.150 inch, in this embodiment the diameter is 1.023 inch and the thickness is 0.100 inch, with the central opening 22 having a thread diameter of M3×0.5 pitch, and apertures 23 having a diameter of 0.06125.

Referring now to FIG. 6 the disks 10 and 20 are supported and separated by three temperature compensating spacers or stand-off rods 25, only two being shown, via threaded pins 26 and 27 which extend through apertures 18 or 23 and into threaded openings or holes 28 and 29 in spacers 25. The spacers 25 are constructed of a piezo ceramic material, such as lead zirconate titanate (for thermal considerations), and in this embodiment have a diameter of 0.100 inch and length of 0.38 inch, whereby the distance (valve length) from an outer surface of disk 10 to an outer surface of disk 20 is 0.66 inch. Spacers 25 may also be constructed of lead magnesium niobate. Captured between disks 10 and 20 via a thrust shaft 30 is a commercially available crystal drive mechanism or mini disk translator 31, such a model No. P-288, manufactured by Physik Instrumente (PI) GmbH & Co., Polytec Platz 5–7, 76337 Waldbronn, Germany. The thrust shaft 31 is composed of two different diameter sections 32 and 33, with section 32 retained in opening 12 of disk 10 and section 33 retained in opening 22 of disk 20. Opening 22 and the end of shaft section 33 may be threaded to retain the shaft 31 in a fixed position. Attached at the vacuum end (section 32) of translator 31 is a seal assembly, generally indicated at 34, which consists of a poppet assembly 35 with a small viton O-ring seal 36 of, for example, 0.5 mm cross section and 2.0 mm internal diameter (ID). Poppet assembly 35 includes an outer flange section 37 within which O-ring 35 is positioned, and a stem sleeve section 38 which extends through section 16 of opening 12 in disk 10 and into section 15 of opening 12 and around a projecting end 39 of section 32 of thrust shaft 30, which is located in sections 13, 14, and 15 of opening 12 of disk 10. An O-ring seal 40 is located in section 14 of opening 12 extends around section 32 of thrust shaft 30, and is composed of viton material with a 1 mm cross section and 4.5 mm ID. A gas inlet is via the passageway 17 (0.039 inch diameter) in disk 10 which is drilled radially at 90° to the axis motion of (shaft 31) and is connected to an inlet compression piece 41 having a fluid or gas passageway 42 therethrough, which is connected to a gas source, not shown. The inlet valve of FIG. 6 is powered by a 12 volt battery or power source indicated at 44 which is stepped up to an adjustable maximum of 750 volts dc. The battery 44 having a voltage step up system is connected via leads 46 and 48 to translator 31. By adjusting the output voltage or pulse width the opening of poppet assembly 35 can be gauged to a maximum of 0.002 inch with a maximum ramp time of less than 3 millisecond. A typical scenario, assuming a vacuum pressure of $3 \times 10^{-9}$ millibar, will allow for a sample size $3 \times 10^{-6}$ Torr liter if the valve is pulsed for 3.5 milliseconds at 750 volts dc, 3 mA output.

It has thus been shown that the present invention provides a piezo electric valve which is battery operated, has low power consumption, has a high pulse rate, and variable flow, with minimal dead volume, and an overall length of not greater than one inch, thereby providing miniaturization of vacuum inlet valves.

While a specific embodiment of the invention has been illustrated and described, a long with specific materials, parameters, etc., such is not intended to be limiting, but provided to exemplify and explain the principles of the invention. Modifications and changes may become apparent to those skilled in the art, and it is intended that the invention be limited only by the scope of the appended claims.

The invention claimed is:

1. A piezo electric valve, comprising:

a first disk having a central opening and a gas inlet passageway, a second disk having a central opening, said first and second disks being interconnected by a plurality of spacers, a thrust shaft having ends located in said central openings of said first and second disks, a disk translator mounted on said thrust shaft, a poppet assembly positioned in said central opening of said first disk and adjacent said gas inlet passageway seal means for said poppet assembly and around an end of said thrust shaft located in said central opening of said first disk, and a dc power source operatively connected for actuating said poppet assembly and controlling passage of gas through said passageway in said first disk.

2. The valve of claim 1, wherein said central opening in said first disk includes four different sections.

3. The valve of claim 2, wherein said four different sections of said central opening have three different diameters.

4. The valve of claim 1, wherein said first and second disks each include a plurality of openings in which said spacers are secured.

5. The valve of claim 1, wherein said plurality of spacers are constructed of material selected from the group consisting of lead zirconate titanate or lead-magnesium-niobate.

6. The valve of claim 1, wherein said first and second disks are constructed of material selected from the group consisting of Inconel, Everdur and Hastalloy.

7. The valve of claim 1, having an overall length of not greater than about one inch.

8. The valve of claim 1, wherein said seal means comprises a plurality of O-ring seals.

9. The valve of claim 1, wherein said thrust shaft includes two different diameter sections, a larger of said two sections being located in said central opening of said first disk, and a smaller of said sections being located in said central opening of said second disk.

10. The valve of claim 1, wherein said gas inlet passageway is adapted to be connected with a gas supply source.

11. The valve of claim 1, wherein said dc power source comprises a 12 volt battery having a capability to be stepped up to an adjustable maximum of −750 volts dc, 3 mA.

12. The valve of claim 1, wherein said poppet assembly includes a member having a flanged section in which an O-ring seal means is located, and a stem section extending into said central opening of said first disk and located adjacent an inner end of said gas inlet passageway.

13. A battery operated miniature piezo electric vacuum inlet valve having low power, high pulse rate, and variable flow, comprising:

a pair of disks separated by a plurality of spacers, one of said pair of disk including a gas passageway, a disk translator mounted intermediate said disks via a shaft operatively connected to said pair of disks, a poppet assembly operatively mounted to said one of said pair of disks and located adjacent said gas passageway, and dc power supply means for activating said poppet assembly for controlling flow through said gas passageway.

14. The value of claim 13, wherein said pair of disks are constructed from material selected from the group consisting of Incoriel, Everdur and Hastalloy.

15. The valve of claim 14, wherein said plurality of spacers are constructed from material selected from the group consisting of lead zirconate titanate and lead-magnesium-niobate.

16. The valve of claim 13, wherein each of said pair of disks has a central opening, said central opening in said one of said pair of disks being larger than said central opening in a second of said pair of disks, and wherein said shaft has end sections of different diameter, with a larger end section thereof positioned in said central opening in said one of said pair of disks.

17. The valve of claim 16, wherein said poppet assembly is mounted in said central opening of said one of said disks.

18. The valve of claim 17, additionally including seal means located adjacent said poppet assembly and said section of said shaft located in said central opening in said one of said pair of disks.

19. The valve of claim 13, additionally including means for stepping up the voltage of said dc power supply.

\* \* \* \* \*